United States Patent
Jung

(10) Patent No.: US 8,694,924 B2
(45) Date of Patent: Apr. 8, 2014

(54) MOBILE TERMINAL HAVING FUNCTION OF MANAGING FILE AND FOLDER

(75) Inventor: Sang-Joon Jung, Seongnam-si (KR)

(73) Assignee: KT Corporation, Seongnam-si, Gyeonggi-do (KR)

( * ) Notice: Subject to any disclaimer, the term of this patent is extended or adjusted under 35 U.S.C. 154(b) by 1667 days.

(21) Appl. No.: 11/758,600

(22) Filed: Jun. 5, 2007

(65) Prior Publication Data

US 2008/0005697 A1    Jan. 3, 2008

Related U.S. Application Data

(63) Continuation of application No. PCT/KR2005/003131, filed on Sep. 21, 2005.

(30) Foreign Application Priority Data

Dec. 6, 2004  (KR) .................. 10-2004-0101616

(51) Int. Cl.
G06F 3/14     (2006.01)
G06F 12/08    (2006.01)
G06F 7/00     (2006.01)

(52) U.S. Cl.
USPC ............... 715/864; 711/3; 707/812

(58) Field of Classification Search
USPC ........................................ 715/825
See application file for complete search history.

(56) References Cited

U.S. PATENT DOCUMENTS

| | | | |
|---|---|---|---|
| 4,680,700 A * | 7/1987 | Hester et al. ............ | 711/206 |
| 5,664,133 A | 9/1997 | Malamud et al. | |
| 5,913,218 A | 6/1999 | Carney et al. | |
| 6,260,101 B1 * | 7/2001 | Hansen et al. ............ | 711/5 |
| 6,901,403 B1 * | 5/2005 | Bata et al. ............... | 1/1 |
| 7,240,292 B2 * | 7/2007 | Hally et al. ............ | 715/778 |
| 2001/0015721 A1 | 8/2001 | Byun et al. | |

(Continued)

FOREIGN PATENT DOCUMENTS

| | | |
|---|---|---|
| CN | 1353539 A | 6/2002 |
| FR | 2 840 706 A | 12/2003 |

(Continued)

OTHER PUBLICATIONS

Polyviou et al., "Pallas: A querying interface for pervasive computing using handheld devices" Pervasive Services, 2004. ICPS 2004. IEEE/ACS International Conference on Piscataway, NJ, USA, IEEE, Jul. 19, 2004, pp. 49-58, XP010759994.

(Continued)

*Primary Examiner* — Boris Pesin
*Assistant Examiner* — Matthew Ell
(74) *Attorney, Agent, or Firm* — Knobbe, Martens, Olson & Bear LLP

(57) ABSTRACT

A mobile terminal having a function of managing files and folders is disclosed. In one embodiment, the mobile terminal displays folder items representing one or more memory elements installed in or joined to the mobile terminal on a display unit when a request to perform a search function is inputted, and displays selection items corresponding to at least one of files included in the folder item and subfolders on the display unit when a select command for a folder item is inputted. At least one embodiment of the invention allows easy management of data (e.g., files, folders, etc.) stored in one or more memory devices installed in or joined to the mobile terminal.

9 Claims, 16 Drawing Sheets

(56) References Cited

U.S. PATENT DOCUMENTS

| | | | |
|---|---|---|---|
| 2001/0028363 A1 | 10/2001 | Nomoto et al. | |
| 2002/0041292 A1 | 4/2002 | Son et al. | |
| 2002/0118165 A1 | 8/2002 | McGowan et al. | |
| 2002/0154177 A1* | 10/2002 | Barksdale et al. | 345/853 |
| 2004/0186857 A1 | 9/2004 | Serlet et al. | |
| 2005/0005242 A1* | 1/2005 | Hoyle | 715/745 |
| 2006/0095647 A1* | 5/2006 | Battaglia et al. | 711/100 |
| 2007/0283046 A1* | 12/2007 | Dietrich et al. | 709/245 |
| 2009/0063694 A1* | 3/2009 | Foo et al. | 709/231 |
| 2011/0004840 A1* | 1/2011 | Feinberg et al. | 715/772 |

FOREIGN PATENT DOCUMENTS

| | | |
|---|---|---|
| JP | 2002-278901 | 9/2002 |
| KR | 2003-0046946 | 6/2003 |
| KR | 2004-0061641 | 7/2004 |
| WO | WO 01/33874 A | 5/2001 |
| WO | WO 01/33874 A1 | 5/2001 |
| WO | WO01/33874 A1 | 5/2001 |
| WO | WO 01/55856 A2 | 8/2001 |
| WO | WO 2004/044727 A | 5/2004 |

OTHER PUBLICATIONS

Supplementary European Search Report for European Patent Application No. 05856339 dated Dec. 4, 2008.

European Search Report for European patent application No. 09175144.6-2201/2146293 dated Feb. 26, 2010 by European Patent Office.

Polyviou et al., "Pallas: A querying interface for pervasive computing using handheld devices" Pervasive Services, 2004. ICPS 2004. IEEE/ACS International Conference on Beirut, Lebanon Jul. 19-23 2004, Piscataway, NJ, USA, IEEE, Jul. 19, 2004, pp. 49-58, XP010759994, ISBN: 978-0-7695-2535-8.

International Search Report from Korean Intellectual Property Office on Jan. 10, 2006.

First Office Action for Chinese Patent Application No. 200580047447.3 dated Mar. 11, 2010 by State Intellectual Property Office of the People's Republic of China.

Chinese Office Action dated Apr. 1, 2013 in Chinese Patent Application No. 200580047447.3.

CN Third Office Action in CN Application No. 2011102272187, dated Aug. 20, 2013.

* cited by examiner

Figure 9

| 0x42 | w | n | . | f | o | 0x0F | 0x00 | check sum | x |
|---|---|---|---|---|---|---|---|---|---|
| 0x0000 | 0xFFFF | 0xFFFF | 0xFFFF | 0xFFFF | 0xFFFF | 0x0000 | | 0xFFFF | 0xFFFF |
| 0x01 | T | h | e | q | u | 0x0F | 0x00 | check sum | u |
| i | c | k | | b | 0x0000 | r | | | o |
| T | H | E | Q | U | I | ~ | F | O | X | 0x20 | NT |
| Creat Date | Last Access Date | 0x0000 | Last Modified Time | Last Modified Date | First Cluster | | | Creat Time |
| | | | | | | | | File Size |

2nd Long Entry (And Last)

First Long Entry

Short Entry

Figure 10

| 1 | 2 | 3 | 4 | 5 | 6 | 7 | 8 | 9 | 10 |
|---|---|---|---|---|---|---|---|---|---|
| 0x02 | 0x03 | 0xFFFF | 0x05 | 0x07 | 0x00 | 0x09 | 0x00 | 0xFFFF | 0x00 |
| 11 | 12 | 13 | 14 | 15 | 16 | 17 | 18 | 19 | 20 |
| 0x00 | 0x00 | 0x00 | 0x00 | 0x00 | 0x00 | 0x00 | 0x00 | 0x00 | 0x00 |

Figure 12

```
              610              620         630 640
0001F200:  41 70 00 68 00 6F 00 74 00 6F 00 0F 00 2A 00 00   Ap h o t o ⅡI *
0001F210:  FF FF FF FF FF FF FF FF FF FF 00 00 FF FF FF FF   yyyyyyyyyy  yyyy
0001F220:  50 48 4F 54 4F 20 20 20 20 20 20 10 00 38 00 00   PHOTO        t 8
0001F230:  26 00 26 00 00 00 00 26 00 02 00 00 00 00 00 00   & &    &  ⏋
0001F240:  00 00 00 00 00 00 00 00 00 00 00 00 00 00 00 00
0001F250:  00 00 00 00 00 00 00 00 00 00 00 00 00 00 00 00
0001F260:  00 00 00 00 00 00 00 00 00 00 00 00 00 00 00 00
0001F270:  00 00 00 00 00 00 00 00 00 00 00 00 00 00 00 00
0001F280:  00 00 00 00 00 00 00 00 00 00 00 00 00 00 00 00
0001F290:  00 00 00 00 00 00 00 00 00 00 00 00 00 00 00 00
0001F2A0:  00 00 00 00 00 00 00 00 00 00 00 00 00 00 00 00
0001F2B0:  00 00 00 00 00 00 00 00 00 00 00 00 00 00 00 00
0001F2C0:  00 00 00 00 00 00 00 00 00 00 00 00 00 00 00 00
0001F2D0:  00 00 00 00 00 00 00 00 00 00 00 00 00 00 00 00
0001F2E0:  00 00 00 00 00 00 00 00 00 00 00 00 00 00 00 00
0001F2F0:  00 00 00 00 00 00 00 00 00 00 00 00 00 00 00 00

| Entry Number | | | |
|---|---|---|---|
| 710 750 | 720 | 730 740 760 | |

| # | Address | Hex | ASCII |
|---|---|---|---|
| 1 | 00023200: | 2E 20 20 20 20 20 20 20 20 20 20 10 00 37 00 00 | .           † 7  |
|   | 00023210: | 26 00 26 00 00 00 00 00 26 00 02 00 00 00 00 00 | & &    & ⌐ |
| 2 | 00023220: | 2E 2E 20 20 20 20 20 20 20 20 20 10 00 37 00 00 | ..          † 7 |
|   | 00023230: | 26 00 26 00 00 00 00 00 26 00 00 00 00 00 00 00 | & &    & |
| 3 | 00023240: | 4E 2E 00 6A 00 70 00 67 00 00 00 0F 00 6B FF FF | B.j p g    II kyy |
|   | 00023250: | FF FF FF FF FF FF FF FF FF FF 00 00 FF FF FF FF | yyyyyyyyyy  yyyy |
| 4 | 00023260: | 01 70 00 38 00 30 00 30 00 31 00 0F 00 6B 30 00 | r p 8 0 0 1 II k0 |
|   | 00023270: | 36 00 30 00 30 00 30 00 32 00 00 00 32 00 36 00 | 6 0 0 0 2  2 6 |
| 5 | 00023280: | 33 43 43 31 32 42 46 45 4A 50 47 20 00 43 00 00 | 3CC12BFEJPG  C |
|   | 00023290: | 26 00 26 00 00 00 00 00 26 00 03 00 41 2F 01 00 | & &    & ᴸ A/r |
| 6 | 000232A0: | 42 2E 00 6A 00 70 00 67 00 00 00 0F 00 01 FF FF | B.j p g    II ryy |
|   | 000232B0: | FF FF FF FF FF FF FF FF FF FF 00 00 FF FF FF FF | yyyyyyyyyy  yyyy |
| 7 | 000232C0: | 01 70 00 38 00 30 00 30 00 31 00 0F 00 01 30 00 | r p 8 0 0 1 II r0 |
|   | 000232D0: | 36 00 30 00 30 00 30 00 32 00 00 00 33 00 30 00 | 6 0 0 0 2  3 0 |
| 8 | 000232E0: | 41 45 32 46 34 46 44 41 4A 50 47 20 00 1A 00 00 | AE2F4FDAJPG  → |
|   | 000232F0: | 26 00 26 00 00 00 00 00 26 00 29 00 06 35 01 00 | & &    & ) -5r |
| 9 | 00023300: | 4E 2E 00 6A 00 70 00 67 00 00 00 0F 00 63 FF FF | B.j p g    II cyy |
|   | 00023310: | FF FF FF FF FF FF FF FF FF FF 00 00 FF FF FF FF | yyyyyyyyyy  yyyy |
| 10 | 00023320: | 01 70 00 38 00 30 00 30 00 31 00 0F 00 63 30 00 | r p 8 0 0 1 II c0 |
|   | 00023330: | 36 00 30 00 30 00 30 00 32 00 00 00 33 00 36 00 | 6 0 0 0 2  3 6 |
| 11 | 00023340: | 41 34 32 33 43 41 38 43 4A 50 47 20 00 41 00 00 | A423CA8CJPG  A |
|   | 00023350: | 26 00 26 00 00 00 00 00 26 00 50 00 85 3F 01 00 | & &    & P -?r |
| 12 | 00023360: | 42 2E 00 6A 00 70 00 67 00 00 00 0F 00 F0 FF FF | B.j p g    II ayy |
|   | 00023370: | FF FF FF FF FF FF FF FF FF FF 00 00 FF FF FF FF | yyyyyyyyyy  yyyy |
| 13 | 00023380: | 01 70 00 38 00 30 00 30 00 31 00 0F 00 F0 30 00 | r p 8 0 0 1 II a0 |
|   | 00023390: | 36 00 30 00 30 00 30 00 32 00 00 00 34 00 31 00 | 6 0 0 0 2  4 1 |
| 14 | 000233A0: | 32 39 43 37 30 31 38 34 4A 50 47 20 00 2E 00 00 | 29C70184JPG  . |
|   | 000233B0: | 26 00 26 00 00 00 00 00 26 00 78 00 28 11 01 00 | & &    & x (◀r |
|   | 000233C0: | 00 00 00 00 00 00 00 00 00 00 00 00 00 00 00 00 | |
|   | 000233D0: | 00 00 00 00 00 00 00 00 00 00 00 00 00 00 00 00 | |
|   | 000233E0: | 00 00 00 00 00 00 00 00 00 00 00 00 00 00 00 00 | |
|   | 000233F0: | 00 00 00 00 00 00 00 00 00 00 00 00 00 00 00 00 | |

…

MOBILE TERMINAL HAVING FUNCTION OF MANAGING FILE AND FOLDER

RELATED APPLICATIONS

This application is a continuation application, and claims the benefit under 35 U.S.C. §§120 and 365 of PCT Application No. PCT/KR2005/003131, filed on Sep. 21, 2005 and, which is hereby incorporated by reference.

BACKGROUND OF THE INVENTION

1. Field of the Invention

The present invention relates to a mobile terminal, more specifically to a mobile terminal having a function of managing files and folders.

2. Description of the Related Technology

Mobile terminals such as cell phones and personal digital assistants, etc. are becoming necessities in today's modern life, and are being equipped with complex devices that enable various functions.

In general, mobile terminals include wireless Internet connection functions in addition to the conventional telephone function, short message communication functions (e.g., news, SMS, etc.), and directory functions. Moreover, the latest mobile terminals further include digital camera functions, for photographing a desired object or storing video clips, and playing functions for sound files in an MP3 format.

As mobile terminals are thus being equipped with various functions, various forms of data (e.g., sent and received short messages, photo images, video clips, etc.) are generated within the mobile terminal, and also various forms of data (e.g., MP3 source data, game contents, etc.) are required to perform the mobile terminals' functions. Since a variety of data is generated by or required for performing the various functions, mobile terminals generally need a large memory.

SUMMARY OF CERTAIN INVENTIVE ASPECTS

One aspect of the invention provides a mobile terminal having a function of managing files and folders, which allows easy management of data (e.g., files, folders, etc.) stored in one or more memory devices installed or joined to the mobile terminal.

Another aspect of the invention provides a mobile terminal having a function of managing files and folders, which provides a simple data storage structure allowing a user to easily access a variety of data generated by the functions of the mobile terminal.

Another aspect of the invention provides a mobile terminal having a function of managing files and folders, which allows adequate processing with a small capacity of working memory, since loading only a minimal number of entry points having minimal sizes in the working memory is sufficient to display the names of the stored data on the display unit.

Another aspect of the invention provides a mobile terminal having a function of managing files and folders, with which user convenience is maximized, as the user may play stored data by selecting the stored data shown on the display unit without predefining the application software.

Another aspect of the invention provides a mobile terminal having a function of managing files and folders, with which additional automation devices (such as a personal computer or a laptop computer, etc.) or data cables are unnecessary in managing the stored data in one or more memory devices.

Another aspect of the invention provides a mobile terminal having a function of managing files and folders, with which the storage region for data generated by the mobile terminal may be configured not only as internal memory but also external memory, to maximize efficiency in memory use.

Another aspect of the invention provides a method of performing a search function in a mobile terminal comprising: displaying folder items representing one or more memory elements installed in or joined to the mobile terminal on a display unit, when a request to perform a search function is inputted and displaying selection items corresponding to at least one of files included in the folder item and subfolders on the display unit, when a select command for a folder item is inputted.

Displaying the selection items may comprise: recording an entry point corresponding to each of the selection items in working memory; obtaining names of the selection items, using entry point and FAT (File Allocation Table) information for an n number (where n is a natural number) of the selection items predefined to correspond to the display area of the display unit, and recording in the working memory; and displaying the obtained names of the selection items on the display unit.

The method of performing a search function in a mobile terminal may further comprise: determining whether or not a scroll command is inputted for renewing the selection items displayed on the display unit; and obtaining the name of a selection item newly included in the display area using its entry point and recording in the working memory, when a scroll command is inputted. Here, the names of the n number of selection items may be names of selection items currently displayed on the display area, names of selection items displayed earlier due to a scroll movement, and names of selection items in a position to be displayed later due to a scroll movement.

The method of performing a search function in a mobile terminal may further comprise: determining whether or not the number of names recorded in the working memory including the names of the selection items newly recorded due to a scroll command exceeds a predefined number m (where m is a natural number); and deleting from the working memory the name of the selection item positioned furthest with respect to the display area, when exceeding an m number.

The method of performing data management of a mobile terminal according to another preferred embodiment of the invention may comprise: generating and displaying a main search screen containing folder items representing memory elements installed in or joined to the mobile terminal, when a request to perform a search function is inputted; extracting and displaying a main menu item—list here, the main menu item list contains main menu items corresponding to at least one of a FAT check, disk check, quick format, full format, and view information—pre-configured in correspondence to the main search screen, when a first menu display request is inputted; determining whether or not a selection information input corresponding to a main menu item is received; and performing a function corresponding to the selection information, when the selection information input corresponding to a main menu item is received.

Performing a function corresponding to the selection information may be accomplished in correspondence to a folder item on which the cursor is positioned or to a memory selection information input.

The method of performing data management of a mobile terminal may further comprise: receiving a selection information input corresponding to a folder item; generating and displaying a sub search screen containing selection items corresponding to at least one of sub-folders or files corresponding to data stored in a memory corresponding to the selection information; receiving a selection information input corresponding to a file; and playing the data corresponding to the selection information.

The method of performing data management of a mobile terminal may further comprise: extracting and displaying a submenu item list—here, the submenu item list contains submenu items corresponding to at least one of refresh, copy, cut, paste, delete, delete all files, unselect file, rename, and create new folder—pre-configured in correspondence to the sub search screen, when a second menu display request is inputted; determining whether or not a selection information input corresponding to a submenu item is received; and performing a function corresponding to the selection information, when a selection information input corresponding to a submenu item is received. Here, performing a function corresponding to the selection information may be accomplished in correspondence to a selection item on which the cursor is positioned.

The mobile terminal may be a cell phone terminal.

Another aspect of the invention provides a method of performing data management with a mobile terminal comprising: i) receiving as input and storing user settings for data storage, ii) determining whether or not data is generated including at least one of an image, video clip, voice data, and writing data, iii) determining whether or not the data can be stored in correspondence to the user settings, when data is generated; storing the data in correspondence to the user settings, when the data can be stored and iv) storing the data using default settings for storing the data, when the data cannot be stored. Here, the user settings may include memory group information for storing the data in one of internal memory or external memory, and folder information for storing the data.

Determining whether or not the data can be stored in correspondence to the user settings, when the user settings further comprise data group information corresponding to at least one of images, video clips, writing data, and downloaded contents, may further comprise: determining whether or not the data group information is satisfied by the generated data; determining whether or not a memory exists corresponding to the memory group, when the data group information is satisfied; and determining whether or not the folder information exists, when the memory exists.

The mobile terminal may be a cell phone terminal.

Another aspect of the invention provides a mobile terminal having a function of managing files and folders.

Still another aspect of the invention provides a mobile terminal comprising: a display unit, a working memory, which stores management information corresponding to folders or files to be displayed on the display unit and a data management unit, which stores a k number (where k is a natural number) of entry points and an m number (where m is a natural number) of name information as the management information in the working memory.

The data management unit may store in the working memory the name information of folders or files corresponding to the display area of the display unit. Also, the data management unit may store in the working memory the name information in correspondence with the entry point for each of the j number (where j is a natural number) of folders or files that do not correspond to the display area of the display unit.

Still another aspect of the invention provides a mobile terminal comprising: a display unit and a working memory which stores management information corresponding to the folders or files to be displayed on the display unit. Here, the amount of first management information for folders or files corresponding to the display area of the display unit and the amount of second management information for folders or files not corresponding to the display area may be unequal.

The first management information may be management information for folders or files corresponding to the display area and management information for a predefined number of folders or files not corresponding to the display area.

Still another aspect of the invention provides a mobile terminal performing a search function comprising: i) one or more memory elements, ii) a key input unit for receiving as input an execute search function request or a select command for a folder item, iii) a data management unit, which generates a main search screen containing folder items that represent the memory elements when an execute search function request is inputted, and which generates a sub search screen containing selection items corresponding to at least one of files and subfolders contained in the folder item when the select command is inputted using the main search screen and iv) a display unit displaying the main search screen and the sub search screen. Here, the data management unit records in the working memory an entry point corresponding to each of the selection items, obtains the names of the n number (where n is a natural number) of the selection items predefined to correspond with the display area of the display unit using the entry points and FAT information of the selection items and records them in the working memory, and then generates the sub search screen using the names of the recorded selection items.

The data management unit may obtain the names of selection items newly incorporated into the display area using the entry points of the selection items, when a scroll command is inputted via the key input unit to renew the selection items, and then renew the sub search screen.

The data management unit may delete the names of the selection items furthest with respect to the display area of the display unit from the working memory, when the number of names recorded in the working memory including the names of selection items newly recorded due to the scroll command exceeds a predefined number m (where m is a natural number).

Still another aspect of the invention provides a mobile terminal performing a data management method comprising: i) an internal memory, ii) a key input unit, which receives as input an execute search function request, a first menu display request, or selection information corresponding to a main menu item, iii) a data management unit, which generates a main search screen containing folder information corresponding to the internal memory and external memory joined to the mobile terminal, and which extracts a main menu item list—here, the main menu item list contains main menu items corresponding to at least one of a FAT check, disk check, quick format, full format, and view information—pre-configured to correspond with the main search screen stored in the internal memory in response to the first menu display request and iv) a display unit displaying the main search screen and the main menu item list. Here, performing a function corresponding to the selection information may be accomplished to correspond with the folder information on which the cursor is positioned or the inputted memory selection information.

The data management unit may generate a sub search screen, containing folder information and file information corresponding to data stored in the memory corresponding to the selection information, when the selection information corresponding to a folder is inputted via the key input unit, and display it via the display unit.

Yet another aspect of the invention provides a mobile terminal performing a data management method comprising: i) a key input unit, which receives as input user settings for data storage, ii) an internal memory, which stores default settings and the user settings and iii) a data management unit, which determines whether or not data—here, the data includes at least one of an image, video clip, voice data, and writing data—is generated, determines whether or not the data can be stored in correspondence to the user settings when data is generated, stores the data in correspondence to the user settings when the data can be stored, and stores the data using the default settings for storing the data when the data cannot be stored. Here, the user settings and the default settings may include memory group information for storing the data in one of internal memory or external memory, and folder information for storing the data.

The data management unit may determine whether or not the data group information is satisfied by the generated data, determine whether or not a memory exists corresponding to the memory group when the data group information is satisfied, and determine whether or not the folder information exists when the memory exists, when the user settings further comprise data group information corresponding to at least one of images, video clips, writing data, and downloaded contents.

BRIEF DESCRIPTION OF THE DRAWINGS

FIG. 9 illustrates the physical information of a root directory region.

FIG. 10 illustrates the information of FAT1.

FIG. 12 illustrates the display format of physical data according to one embodiment of the invention.

FIG. 14 illustrates the display format of physical data according to another embodiment of the invention.

DETAILED DESCRIPTION OF CERTAIN INVENTIVE EMBODIMENTS

Hereinafter, embodiments of the invention will be described in detail with reference to the appended figures where the same components are rendered the same reference number regardless of the figure number.

Figure 1:
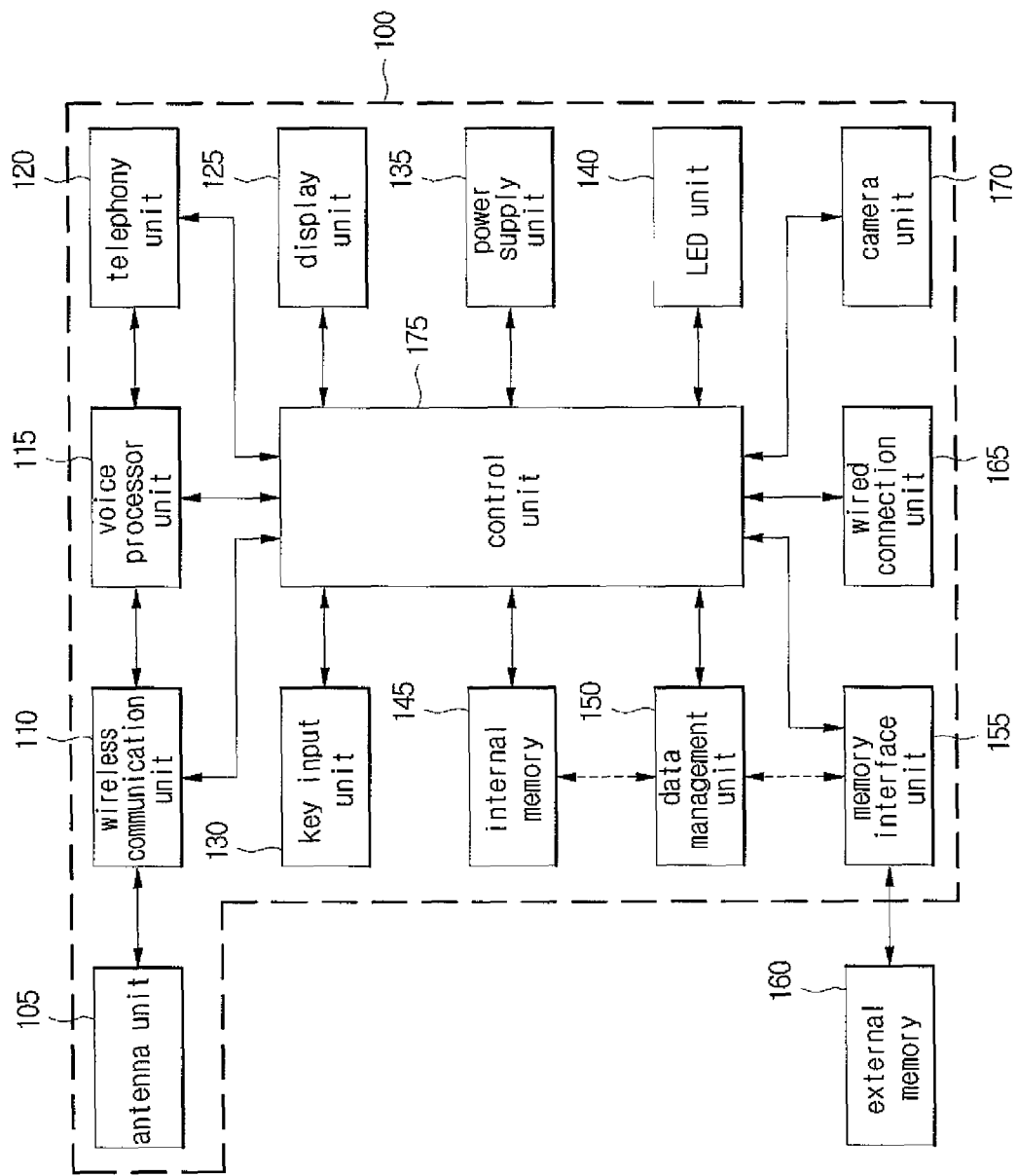
FIG. 1 is a block diagram illustrating the composition of a mobile terminal having a function of managing files and folders according to one embodiment of the invention.

FIG. 1 is a block diagram illustrating the composition of a mobile terminal 100 having a function of managing files and folders according to one embodiment of the invention.

As shown in FIG. 1, a mobile terminal 100 based on the present invention comprises an antenna unit 105, a wireless communication unit 110, a voice processor unit 115, a telephony unit 120, a display unit 125, a key input unit 130, a power supply unit 135, an LED unit 140, an internal memory 145, a data management unit 150, a memory interface 155, a wired connection unit 165, a camera unit 170, and a control unit 175.

It is apparent that the mobile terminal 100 based on the present invention may be realized with some of the components shown in FIG. 1 (for instance, the camera unit 170, the memory interface 155, etc.) omitted, and that some components (for instance, the data management unit 150, etc.) may be implemented in the form of a software program created to perform identical functions.

The antenna unit 105 sends transmission signals (e.g. voice signals from a user, phone call requests, message transmission requests, wireless Internet connection requests, etc.) received from the wireless communication unit 110 to a mobile communication service system (not shown), and receives wireless signals (e.g. voice signals from other users, contents data, etc.) from the mobile communication service system (not shown) to transfer to the wireless communication unit 110.

The wireless communication unit 110 is joined to the antenna unit 105, transfers wireless signals received from the mobile communication service system to the telephony unit 120 or memory (i.e. internal memory 145 or external memory 160), and transmits, via the antenna unit 105 to the mobile communication service system, voice signals inputted via the telephony unit 120 and/or content selection signals, etc., inputted via the key input unit 130 for wireless data service.

The voice processor unit 115 processes voice signals received via the wireless communication unit 110 to be outputted via the telephony unit 120, and also processes voice signals inputted via the telephony unit 120 to be transferred to the wireless communication unit 110.

The telephony unit 120 may comprise a speaker (not shown) and microphone (not shown). The speaker is a means to output voice signals received via the antenna unit 105 from the mobile communication service system, sounds produced when selecting keys on the key input unit 130, and multimedia data play sounds, etc., and the microphone is a means to receive as input the voice of the mobile terminal 100 user.

The display unit 125 is a means to display a search screen for displaying data stored in the internal memory 145 and external memory 160 in the form of files (i.e. the smallest unit for performing a function to output the data in the mobile terminal 100) and folders (i.e. grouping units to group and manage files according to type or purpose), etc., action results corresponding to key selections by the user, and current time, etc. The display unit 125 may for example be an LCD screen.

The key input unit 130 has a plurality of keys (e.g. number keys, letter keys, function keys, etc.) and is a means of receiving as input a search screen display request, and a telephone number corresponding to a receiver terminal, etc., from the user.

The power supply unit 135 performs the function of supplying operation power to the mobile terminal 100. The power supply unit 135 may for example be a connection element for connecting with batteries, or solar batteries, etc.

The LED unit 140 performs the function of turning LED's on and off according to the control of the control unit 175 to notify the user in the event of an incoming call to the mobile terminal 100.

The internal memory 145 stores the operation program of the mobile terminal 100, communication-related information (e.g. the electronic serial number of the terminal, phone number, etc.) which enables the mobile terminal 100 to perform communication services, the user's personal information (e.g. phone number directory, SMS transmission data, etc.), and recent call records (i.e. recent called number, recent received number), etc. According to the type of stored information, the internal memory 145 may be composed as a plurality of memory devices, or may be segmented into multiple storage areas. For example, the internal memory 145 may be divided into an area for storing critical information such as communication-related information, etc., an area for storing information that may be managed by the user such as the user's personal information, and a free storage area which may join with an automation device such as a computer, etc., to operate in the manner of external memory, etc.

The data management unit 150 stores data received from the mobile communication service system (e.g. SMS messages, wireless Internet contents, etc.) and data generated by the camera unit 170, etc., in the internal memory 145 or external memory 160. Also, the data management unit 150 generates a search screen, in response to a search screen display request inputted via the key input unit 130, which displays the data stored in the internal memory 145 or external memory 160 in the form of files and folders, to be displayed via the display unit 125. When the user has pre-established data storage conditions, the data management unit 150 stores received data or generated data in the internal memory 145 or external memory to correspond to the data storage conditions. The data management unit 150 may be comprised in the control unit 175. A detailed description will be given later with reference to related figures on the process of storing data in correspondence to the user-established data storage conditions.

The memory interface 155 is a means to join the mobile terminal 100 and the external memory 160.

The wired connection unit 165 joins via a USB data cable, etc. the mobile terminal 100 and an automation device (e.g. a computer, etc.), and receives data management signals (e.g. delete data, copy data, etc.) from the automation device to transfer to the control unit 175. The control unit 175 manages the data stored in the internal memory 145 and external memory 160 in correspondence to the data management signals.

The camera unit 170 generates image data or video data corresponding to an exterior picture in response to a photograph command inputted via the key input unit 130.

The control unit 175 controls the antenna unit 105, wireless communication unit 110, voice processor unit 115, telephony unit 120, display unit 125, key input unit 130, power supply unit 135, LED unit 140, internal memory 145, data management unit 150, memory interface 155, wired connection unit 165, and camera unit 170, so that the mobile terminal 100 based on the invention may perform the file and folder management function.

The control unit 175 or the data management unit 150 may comprise working memory (e.g. buffer memory) which stores an entry point corresponding to each file and/or folder to display the name of the file and/or folder via the display unit 125. The entry point is information related to the location of the name and the location of the file for searching data corresponding to the name of a file and/or folder. A detailed description will be given later with reference to related figures on the process of the control unit 175 or the data management unit 150 of extracting and displaying on the display unit 125 the name of a file and/or folder using an entry point. However, the description hereinafter will assume the case of the data management unit 150 generating a search screen for display via the display unit 125.

Figure 2:
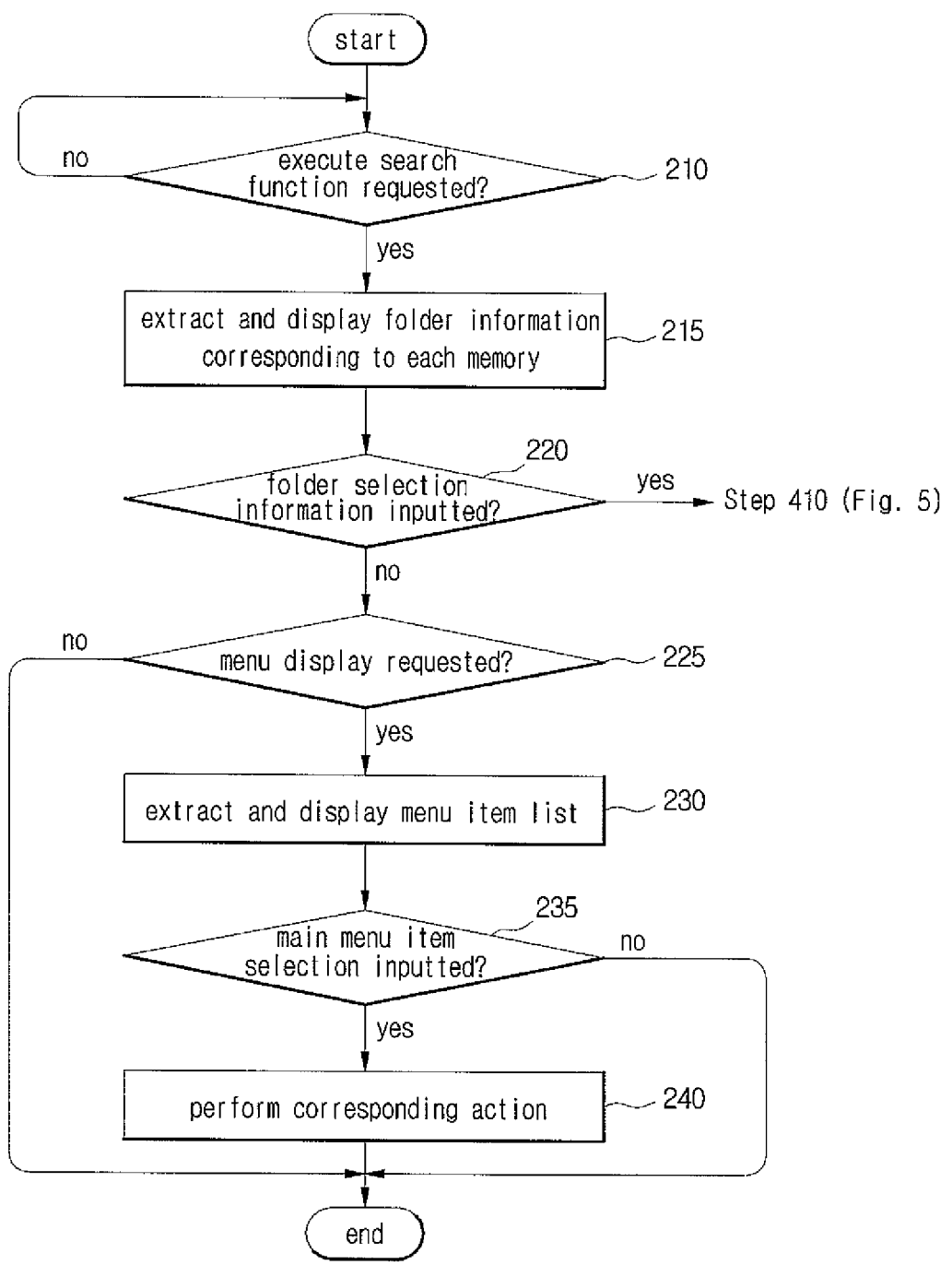
FIG. 2 is a flowchart illustrating a method of displaying the main folder and managing memory according to one embodiment of the invention.
Figure 3:
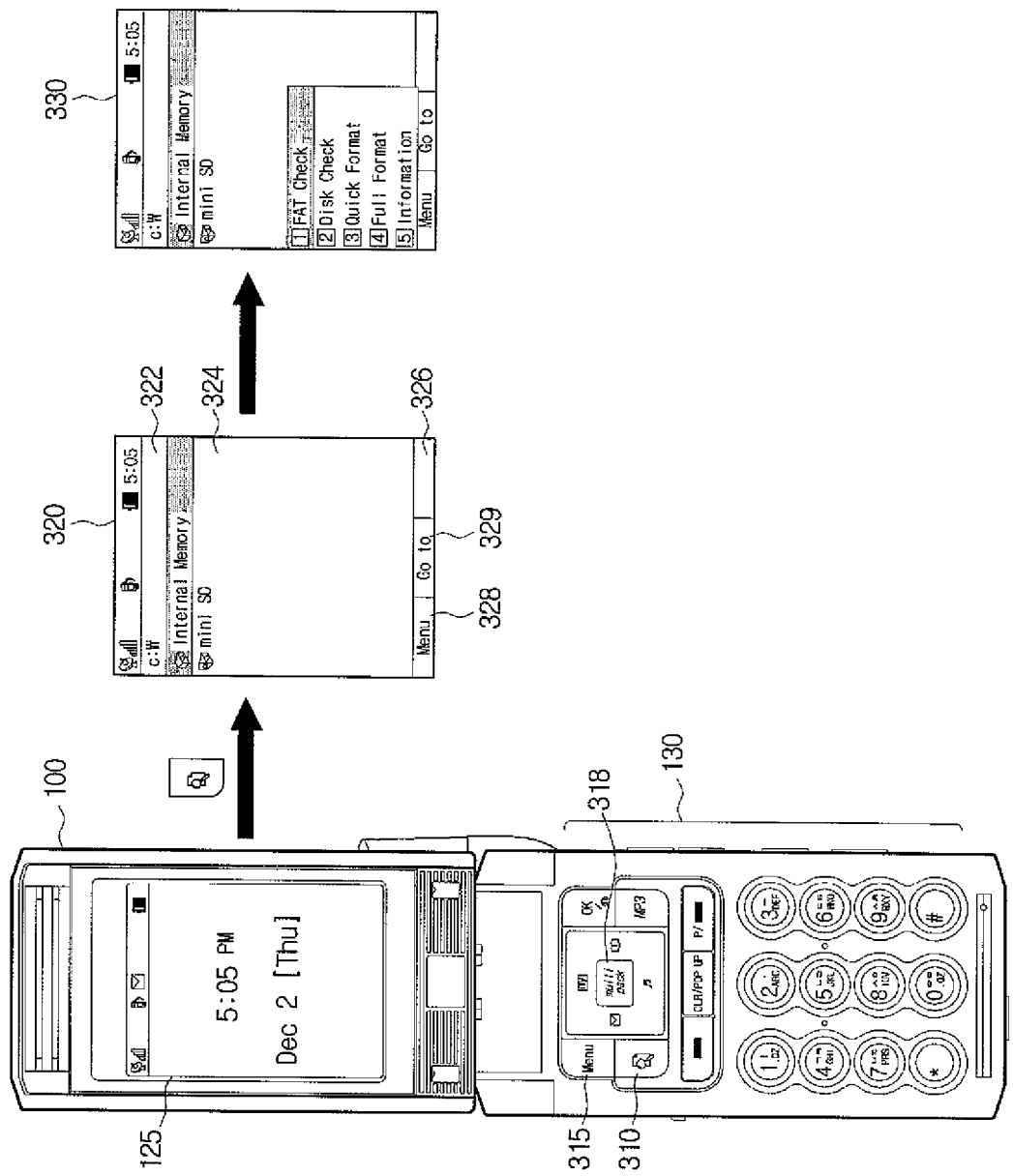
FIG. 3 shows an example of a user interface screen for managing memory according to one embodiment of the invention.
Figure 4:
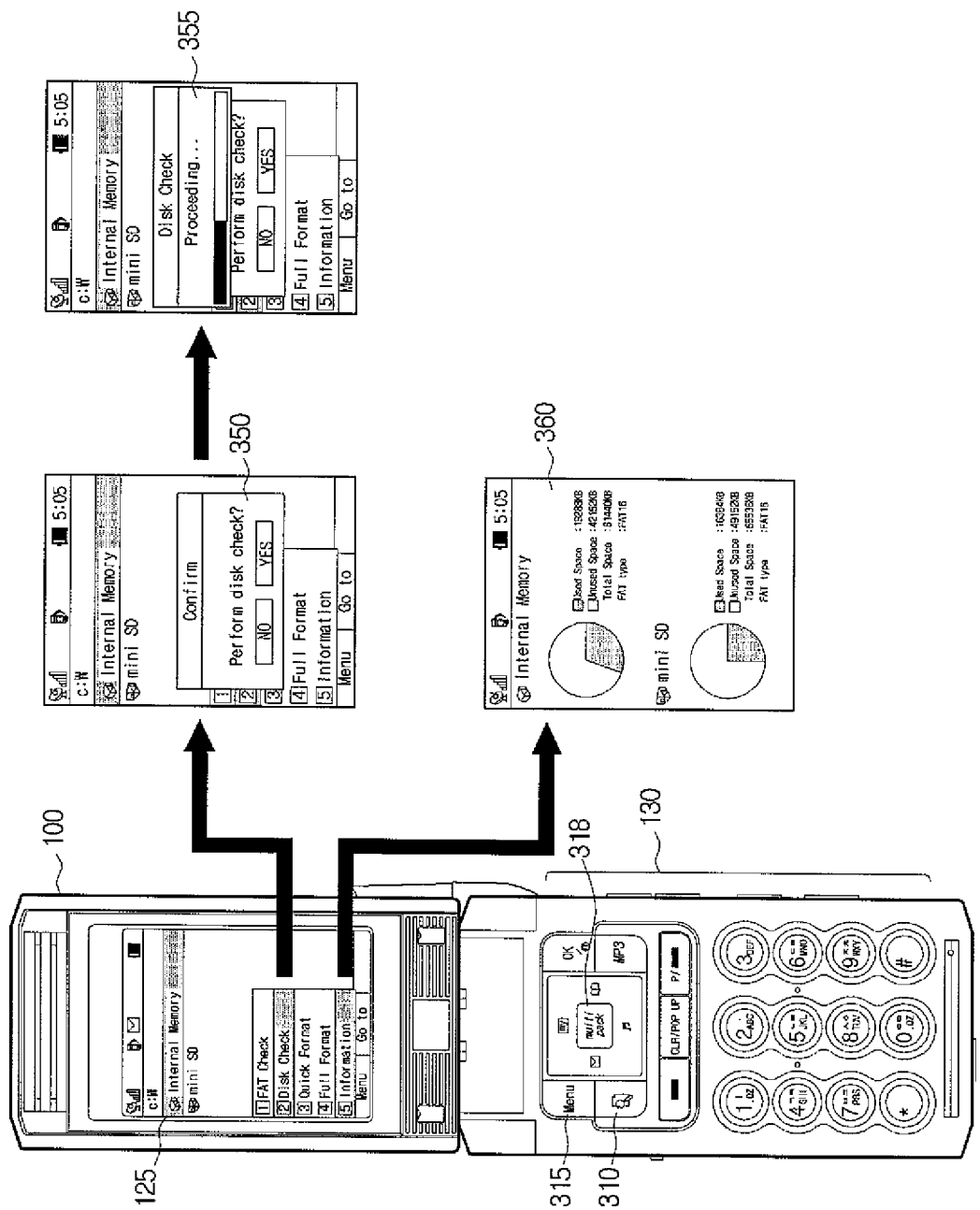
FIG. 4 shows memory management operations according to one embodiment of the invention.

FIG. 2 is a flowchart illustrating a method of displaying the main folder and managing memory according to a preferred embodiment of the invention; FIG. 3 shows an example of a user interface screen for managing memory according to one embodiment of the invention; and FIG. 4 shows memory management operations according to one embodiment of the invention.

As shown in FIG. 2, the data management unit 150 of the mobile terminal 100 determines in step 210 whether or not an execute search function request has been inputted by the user. The user may input an execute search function request by selecting a search function key 310 (see FIG. 3) positioned on the key input unit 130 or by first selecting a menu key 315 (see FIG. 3) and then selecting, from the menu items displayed on the display unit 125, a menu item pre-configured to execute a search function.

When the execute search function request is inputted, the data management unit 150 extracts folder information pre-configured to correspond to the internal memory 145 installed in the mobile terminal 100 and/or the external memory 160 joined via the memory interface 155, constructs a search screen, and afterwards displays it via the display unit 125 in step 215. FIG. 3 shows a display example of the search screen. A detailed description will be given later with reference to related figures on the process of the data management unit 150 of recording and managing entry points in the working memory to generate a search screen.

As shown in FIG. 3, when the user selects a menu item pre-configured to execute the search function from the menu items displayed on the display unit 125 by an input via the search function key 310 or the menu key 315 while the main screen (or a certain function screen) is on the display unit 125 of the mobile terminal 100, a main search screen 320 displaying each memory (i.e. the internal memory 145 and external memory 160) as the main folders is shown on the display unit 125. The main search screen 320 includes the directory display area 322, the list display area 324, and the function selection area 326. The function selection area 326 includes a menu display item 328 and a go to item 329. The menu display item 328 is activated when the menu key 315 is selected, and the go to item 329 may be co-operated with the multi-pack key 318 or function keys around the multi-pack key 318. For instance, if the user selects the multi-pack key 318 or the key positioned to the right of the multi-pack key 318, a search screen moved to the contents inside the folder is displayed (see FIG. 6). In addition, when the user selects a key above or below the multi-pack key 318, a cursor may be displayed to move on the screen.

Looking again at FIG. 2, the data management unit 150 determines in step 220 whether or not folder selection information has been inputted by the user. As described above, an input for the folder selection information may be recognized, when the user moves the cursor to the name of a folder and then selects the multi-pack key 318 or the key to the right of the multi-pack key 318.

When the folder selection information has not been inputted, the data management unit 150 determines in step 225 whether or not a menu display request has been inputted by the user. The user may input a menu display request by selecting a function key (for instance, the menu key 315—see FIG. 3) pre-configured to activate the menu display item 328 (see FIG. 3).

When the menu display request is inputted, the data management unit 150 extracts a main menu item list configured to co-operate with the main search screen 320 (see FIG. 3) and displays it on the display unit 125. FIG. 3 shows an example of a main menu item list display screen 330. As shown in FIG. 3, the main menu item list may include a "FAT Check" item, a "Disk Check" item, a "Quick Format" item, a "Full Format" item, and an "Information" item.

Looking again at FIG. 2, the data management unit 150 determines in step 235 whether or not a main menu item has been selected. When a main menu item has been selected, the process continues to step 240 to perform an action corresponding to the selected main menu item.

FIG. 4 shows an example of action status display screen corresponding to the main menu item selected by the user.

The user may input an execute request for a main menu item by using pre-configured move cursor keys (e.g. function keys around the multi-pack key 318) to move the cursor to an appropriate position and selecting a selection key (e.g. the multi-pack key 318, etc.) or by selecting a number key corresponding to the main menu item.

As shown in FIG. 4, the main menu item list may include a "FAT Check" item, a "Disk Check" item, a "Quick Format" item, a "Full Format" item, and an "Information" item. The "FAT Check" item is for checking the status of the FAT (File Allocation Table), which is a table recording the usage status of the data area besides the management area for each memory device, and the "Disk Check" item is for checking the status of each memory device. The "Quick Format" item is for initializing the entire FAT1/2 to 0 and the remainder of data to 00 or 0 for a memory device. The "Full Format" item is for initializing the manager, which enables NAND flash memory to be used as RAM by means of a software. A full format returns NAND flash memory to its initial state. The "Information" item is for checking the information for each memory. Each main menu item may be for selecting an action for the memory corresponding to the current position of the cursor. Also, the user may select a main menu item and then select the memory to effect an action performed corresponding to the selected memory. When the user inputs a format command for the internal memory 145, the data management unit 150 may recognize it to be a format command for only the free storage area, which joins an automation device such as a computer, etc. to operate as external memory.

First, when the user selects the "Disk Check" item, a confirmation window 350 is displayed on the display unit 125, and when the user selects the OK key, a proceeding window 355 is displayed while a disk check is performed corresponding to the selected memory.

Next, when the user selects the "Information" item, an information display screen 360, including memory information (e.g. total space, used space, etc.) corresponding to the selected memory, is displayed on the display unit 125. The information display screen 360 in the example shows the memory information displayed in a case where the user has not selected a particular memory device or has selected all memory devices.

As described above, the mobile terminal 100 based on the present invention has the advantage of being able to perform by its own operations a memory management method, which in prior art was possible only on a computer joined via a USB data cable and having a data management program corresponding to the mobile terminal 100 installed.

Figure 5:
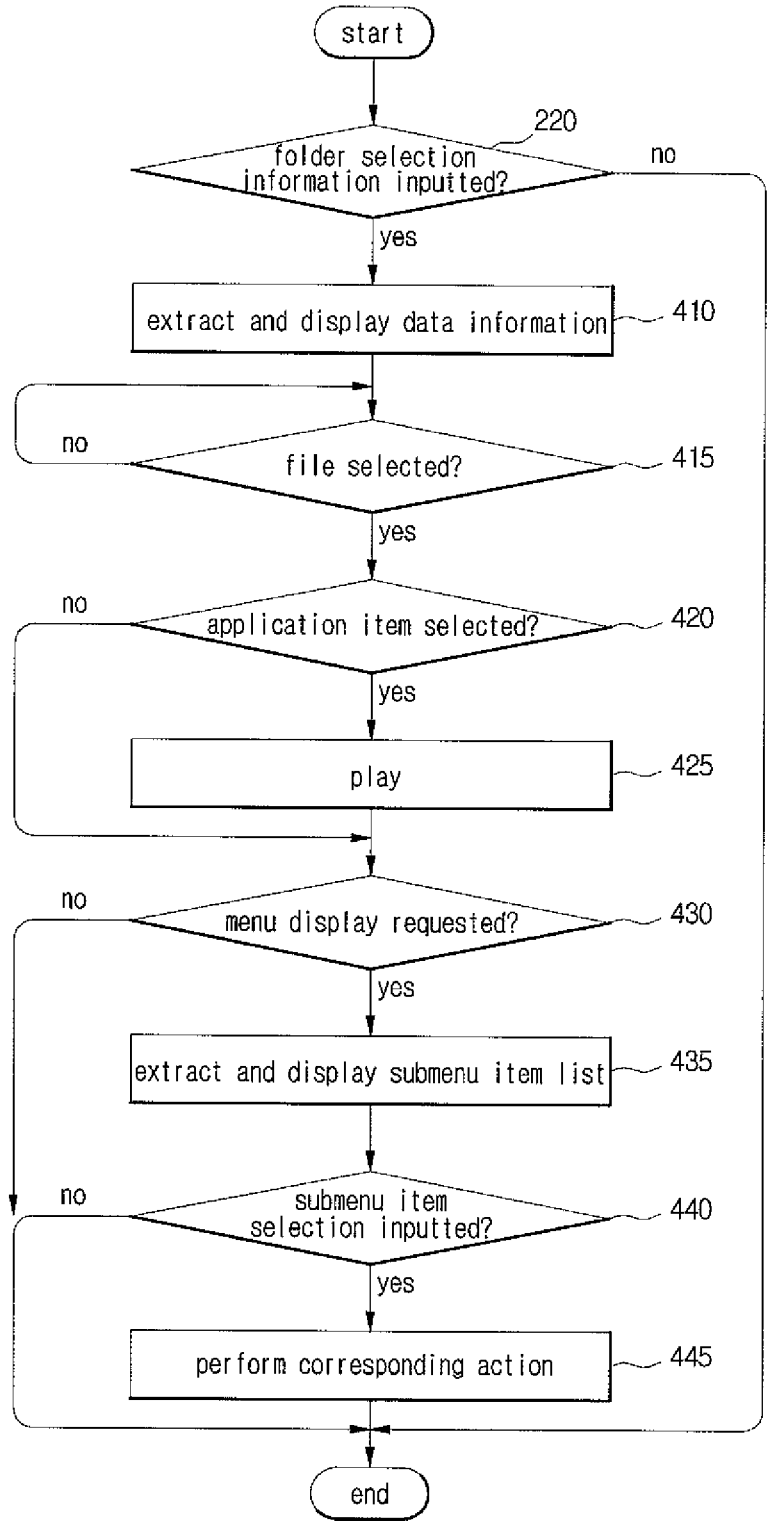
FIG. 5 is a flowchart illustrating a method of managing files according to one embodiment of the invention.
Figure 6:
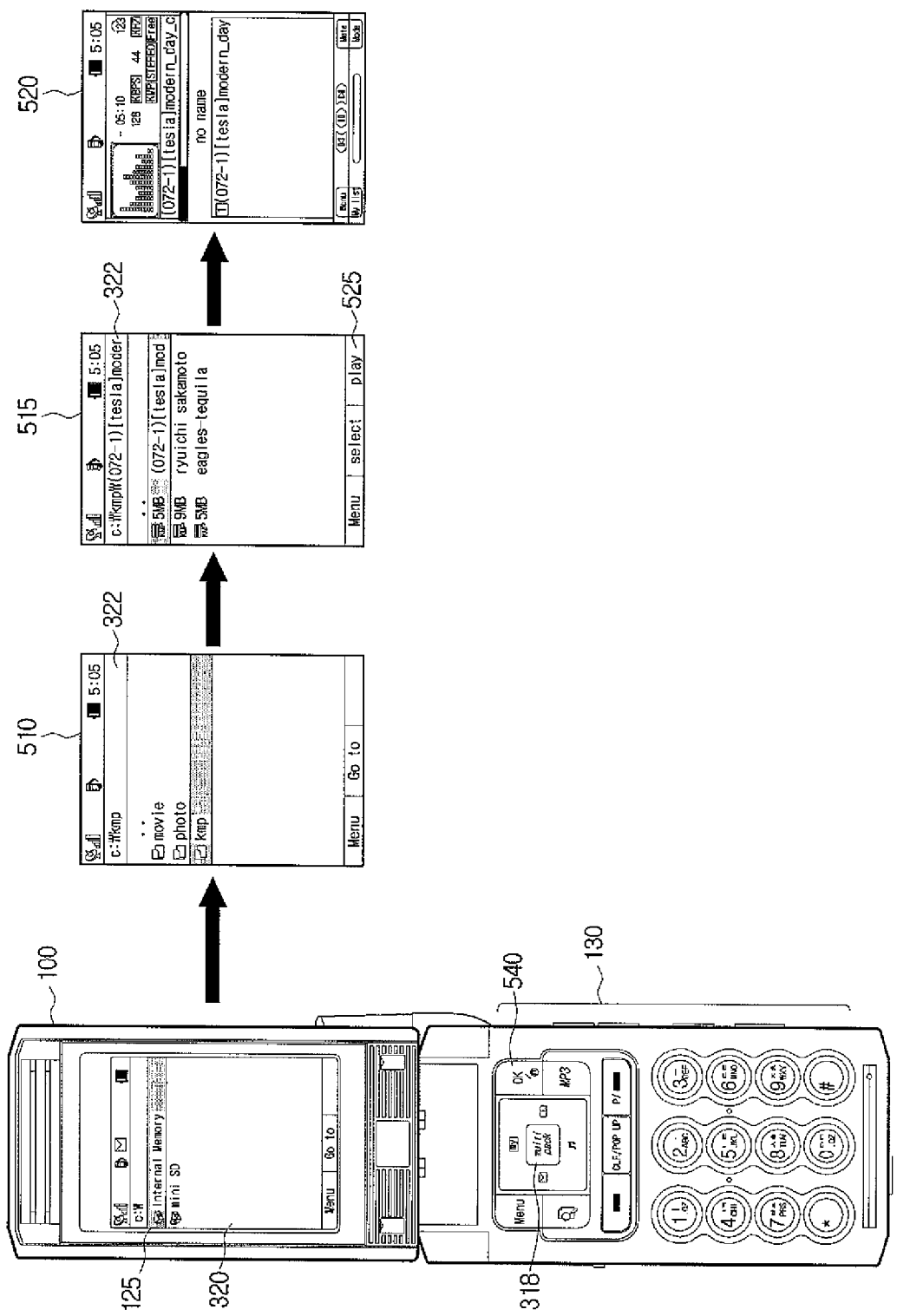
FIG. 6 shows an example of a user interface screen for playing files according to one embodiment of the invention.
Figure 7:
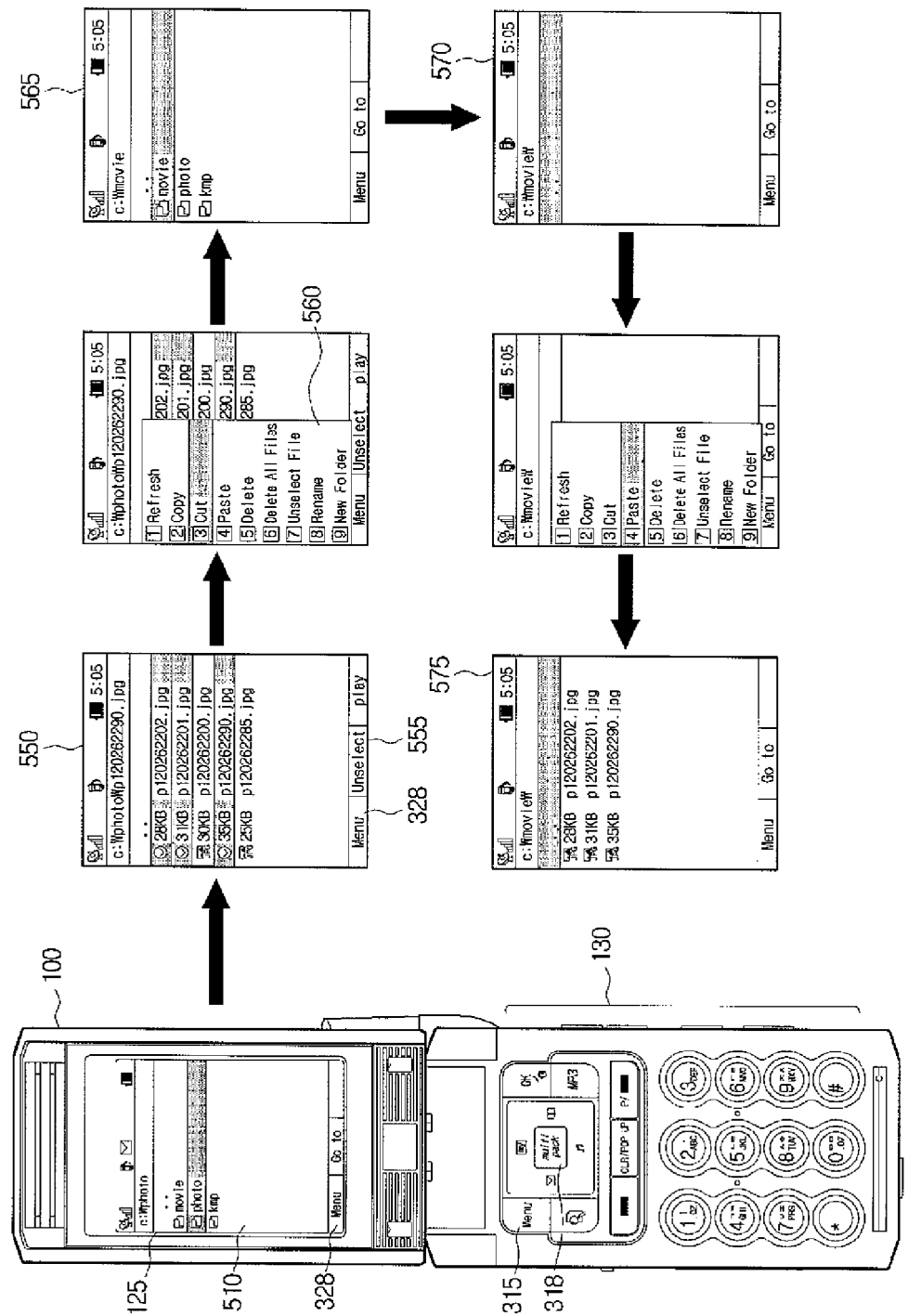
FIG. 7 shows an example of a user interface screen for moving files contained in a folder to another folder according to one embodiment of the invention.

FIG. 5 is a flowchart illustrating a method of managing files according to one embodiment of the invention; FIG. 6 shows an example of a user interface screen for playing files according to one embodiment of the invention; and FIG. 7 shows an example of a user interface screen for moving files contained in a folder to another folder according to one embodiment of the invention.

As shown in FIG. 5, the data management unit 150 determines in step 220 whether or not folder selection information has been inputted. As described above, when the user positions the cursor on a folder name and selects the multi-pack key 318 or the key to the right of the multi-pack key 318, the data management unit 150 recognizes it as folder selection information input and displays a sub search screen moved to the folder on the display unit 125.

When the folder selection information is inputted, the data management unit 150 extracts the data stored in the memory corresponding to the folder selection information, constructs a sub search screen 510, 515 (see FIG. 6) and displays it via the display unit 125 in step 410.

Next, the data management unit 150 determines in step 415 whether or not a file displayed in the sub search screen 515 (see FIG. 6) has been selected by the user. Step 415 may involve moving the cursor to correspond to a file. If a file has not been selected, the process remains at step 415. Of course, a user may make a selection to move to another folder or to end the search function.

However, when a file has been selected, it is determined in step 420 whether or not the application item 525 (see FIG. 6), corresponding to the selected file, is selected. When the application item has been selected, the mobile terminal 100 shows an application result screen corresponding to the file on the display unit 125. For example, if the file selected by the user is an image file, a screen showing the image file is displayed on the display unit 125. Also, if the file selected by the user is an MP3 sound file, an action status screen 520 (see FIG. 6) is displayed on the display unit 125, while the sound is outputted via the speaker. Thus, the user may specify a file displayed in the search screen and select the application item 525 to play the corresponding file. Therefore, the user does not need to pre-select the desired application (e.g. show image, play video clip, play MP3 file, etc.). When the user has requested an application after selecting a file, the control unit 175 checks the format of the file, launches the application that can execute files of such format, and plays the corresponding file.

The process from step 220 to step 425 described above will be explained briefly with reference to FIG. 6.

As shown in FIG. 6, when the main search screen 320 is displayed on the display unit 125 and the user selects the selection key (e.g. the multi-pack key 318 or the key to the right of the multi-pack key 318) while the cursor is positioned on a folder corresponding to a memory device, a sub search screen 510 is displayed on the display unit 125 showing the folders and/or files stored in the selected memory device. Also, when the user positions the cursor on a folder included in the sub search screen 510 and inputs the selection key, a sub search screen 520 is displayed on the display unit 125 showing the folders and/or files stored to correspond to the folder. The position of the folder in which the files shown on the display unit 125 are stored can be checked through the directory display area 322.

When the user moves the cursor to a file included in the sub search screen 515 and activates the application item 525, an application result screen 520 is displayed on the display unit 125 in which the file is played or in which the play operation of the file is shown. The application item 525 may be configured to match the selection button 540. Also, if the selected file requires a concurrent sound information output, the corresponding sound is outputted simultaneously through the speaker. The application result screen 520 of FIG. 6 illustrates the play operation of a sound file. The user may play particular files sequentially by specifying additional sound files to be played, or by specifying multiple sound files displayed on the sub search screen 515 at once, using function keys positioned on the application result screen 520.

Looking again at FIG. 5, the data management unit 150 determines in step 430 whether or not a menu display request has been inputted by the user. The user may input a menu display request by selecting a function key (e.g. the menu key 315—see FIG. 7) pre-configured to activate the menu display item 328 (see FIG. 7).

When the menu display request has been inputted, the data management unit 150 extracts a submenu item list corresponding to the sub search screen 515, 520 (see FIG. 6) and displays it via the display unit 125. The submenu item list may contain a "Refresh" item, a "Copy" item, a "Cut" item, a "Paste" item, a "Delete" item, a "Delete All Files" item, an "Unselect File" item, a "Rename" item, and a "New Folder" item, etc.

The data management unit 150 determines in step 440 whether or not a submenu item selection included in the submenu item list has been inputted by the user.

When the submenu item selection is inputted, the process continues to step 445 to perform a corresponding action.

Hereinafter, the process is described whereby the user moves a plurality of files from the "photo" folder to the "movie" folder using the "Cut" item and the "Paste" item from among the submenu items.

In FIG. 7, a sub search screen 510 corresponding to the internal memory 145 is displayed on the display unit 125, and when the user selects the selection key (e.g. the multi-pack key 318 or the key to the right of the multi-pack key 318) while the cursor is positioned on the "photo" folder, a sub search screen 550 is displayed on the display unit 125 showing folders and/or files stored to correspond to the folder.

The user positions the cursor on the file that the user desires to move and then inputs the selection key (e.g. the multi-pack key 318, etc.) to establish the files as an object file for moving. When a file is established as an object file, the icon to the left of the file name is altered, and a function item 555 for unselecting the file is displayed in the function selection area 326. When the cursor is positioned on a file other than the object file, the function item 555 is displayed as "Select" to allow the file to be changed to an object file using the selection key, and when the cursor is positioned on an object file, the function item 555 is displayed as "Unselect" to allow the file to be unselected using the selection key. As seen in the screen 550, the user selects a plurality of files as object files, and then inputs the menu key 315 to show the submenu item list 560.

Afterwards, the user selects the "Cut" item in the submenu item list 560. Next, the user moves to the folder to which the object files are to be moved 565, 570, and inputs the menu key 315 to select the "Paste" item displayed in the submenu item list 560.

Consequently, the files established as objects files are stored in the folder as shown in screen 575, and the object files that are stored in the original folder (i.e. the "photo" folder) are deleted.

The mobile terminal 100 based on the present invention can perform, by its own operations, a variety of functions which are included in the submenu item list or which may further be added. The functions and operation of the submenu items besides the "Cut" item and "Paste" item described above may easily be understood by those skilled in the art, and further explanations are omitted.

Figure 8:
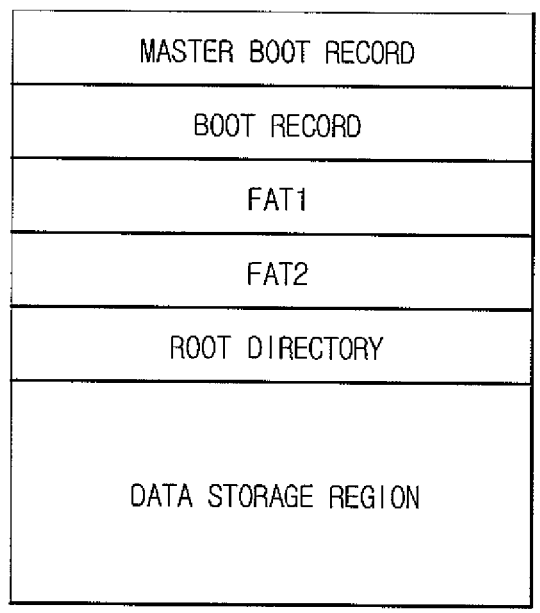
FIG. 8 illustrates the structure of a FAT16 file system.
Figure 11:
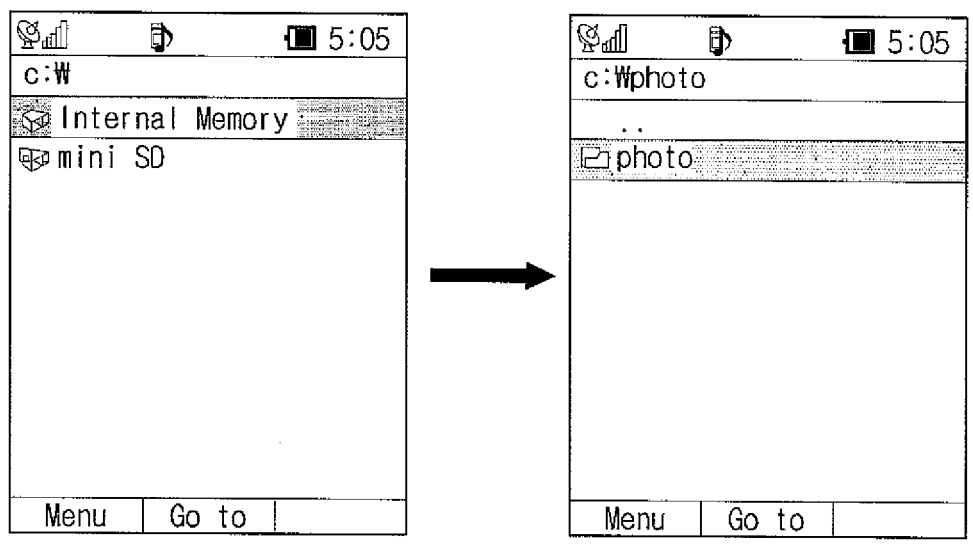
FIG. 11 shows an example of a user interface screen according to one embodiment of the invention.
Figure 13:
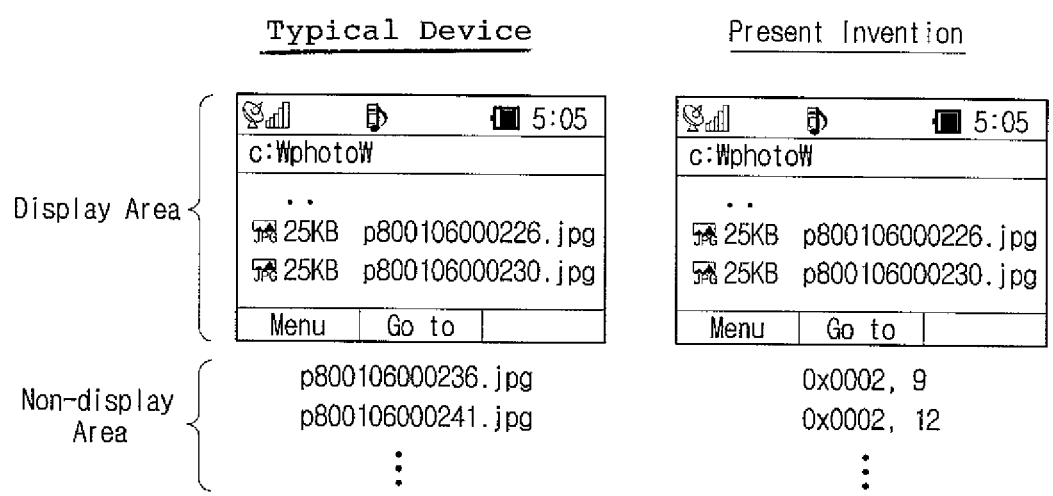
FIG. 13 provides a comparison between the methods of managing display information in a typical device and in a device according to one embodiment of the present invention.
Figure 15:
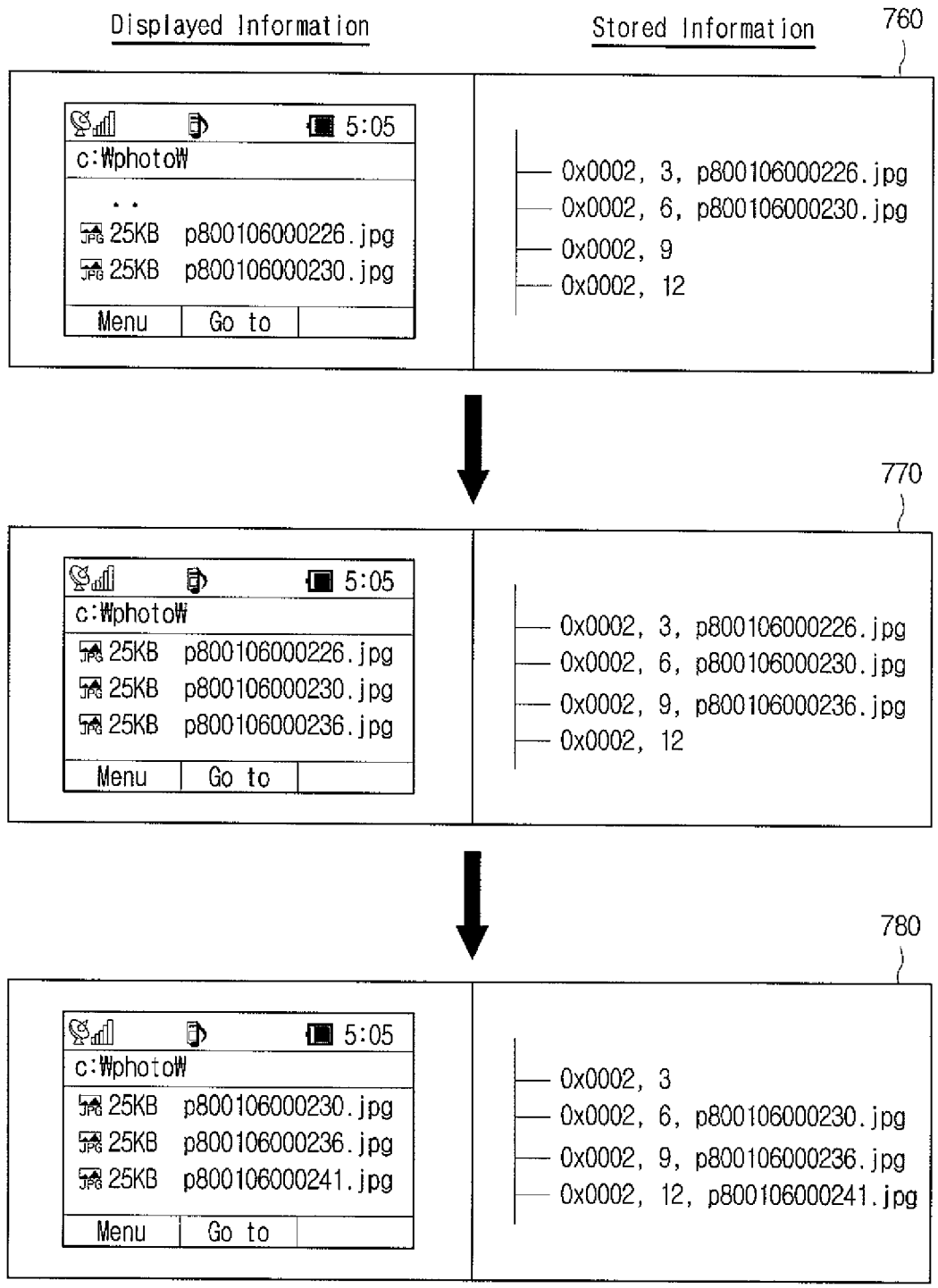
FIG. 15 illustrates a method of managing stored data with changes in the displayed information according to one embodiment of the invention.

FIG. 8 illustrates the structure of a FAT16 file system; FIG. 9 illustrates the physical information of a root directory region; and FIG. 10 illustrates the information of FAT1. FIG. 11 shows an example of a user interface screen according to one embodiment of the invention; and FIG. 12 illustrates the display format of physical data according to one embodiment of the invention. FIG. 13 provides a comparison between the methods of managing display information in prior art and in the present invention; FIG. 14 illustrates the display format of physical data according to another preferred embodiment of the invention; and FIG. 15 illustrates a method of managing stored data with changes in the displayed information according to one embodiment of the invention.

As shown in FIG. 8, the structure of a FAT16 file system comprises a 'MASTER BOOT RECORD,' which determines the physical number of partition regions, a 'BOOT RECORD,' which represents information on the capacity of the storage device, the type of file system, and the separation unit of the regions, etc., and 'FAT1,' which represents the location information of files. FAT2 is a region containing a copy of 'FAT1,' since the location information of files is important data which changes frequently.

The location of files may be obtained by interpreting the information of the 'FAT1/2' regions and the 'BOOT RECORD' region. The location of the root directory may also be obtained, which may be used as a first access point in accessing data. The size of the root directory region has a constant fixed value, and the region beyond it is used as a data region.

The process is briefly explained whereby data management unit 150 finds a file named 'The quick brown.fox,' using the physical information of the root directory region illustrated in FIG. 9.

The data management unit 150 first searches the root directory. Assuming that the '2nd Long Entry' data is stored first in the root directory as in FIG. 9, the '0X42' value is referenced to determine that it is a valid file, and interpretation commences.

The data management unit 150 recognizes it to be the second entry from the '2' of '0X42,' searches 32 bytes to determine that there is a first entry, and then searches the 32 bytes to determine that there is a short entry.

As in FIG. 9, only a portion of the name is displayed in the short entry, and data on the create time and file size, etc. is located in a pre-defined region beyond.

The data management unit 150 extracts the actual long file name of 'The quick brown.fox' and determines whether or not it matches the file name being searched.

If it is determined to match the file name being searched, the value of the first cluster is checked to find which region the file is actually located in, and the corresponding data is extracted.

The data management unit 150 based on the present invention checks the first cluster to find which region the file is actually located in.

If it is assumed that the value of the first cluster is '0x04,' the data management unit 150 checks the fourth value (i.e. '0x05') stored in 'FAT1' illustrated in FIG. 10. '0x05' occupies multiple cluster spaces, meaning that the information stored in the fifth space also continues to correspond to the file content. That is, FIG. 10 shows that this file is in cluster 4, 5, 7, and 9. Here, the '0xFFFF' value represents the end.

As the above, when searching a file, the root directory is searched first, and if the file name found matches the name being searched, the value of the first cluster is referenced in 'FAT1' to read or change the content of the file. However, if the names do not match, the next region is checked to again determine the existence of a match.

The search method described above may also be applied to the case of searching directories.

For example, explaining the case of searching a file named 'c-quick brown.fox,' the directory named 'a' in the root directory is first searched. The names of files or directories exist in the contents of the directory named 'a,' as in FIG. 9, and a directory named 'b' is searched. The file 'The quick brown-.fox' is found eventually as the above process is performed sequentially.

The file search method described above may be used to display the names of files and/or folders on the display unit 125 when an application has been launched.

However, the conventional method of displaying file and folder names used the method of first searching the file and folder names in a particular directory and storing in the buffer memory, when there was a need to display the names of files and/or folders due to the launching of an application, etc., and then displaying the file and folder names corresponding to the position of the cursor.

However, this method had to search all file and folder names from the beginning and store them in the buffer memory, so that a lot of time was required in searching the names and an excessively large storage capacity of the buffer memory was necessary. This meant that, since a file name may occupy up to 512 bytes for the case of FAT16, displaying 5000 files and folders under a particular directory required the storage capacity of the buffer memory to be at least 2,560,000 bytes (i.e. 512 bytes×5000).

Thus, the data management unit 150 based on the present invention does not search all names from the beginning and load them in the buffer memory load in displaying the names of files and/or folders on the display unit 125, but instead pre-searches a minimal number of names and load them in the buffer memory, loading only the entry points in the buffer memory for the remaining files and/or folders.

The entry point comprises address data, for calculating the starting position for searching the name of a file and/or folder, and an entry number, forming the basis of the starting position, and the size of an entry point is 4 bytes.

Assuming a limit of just three names displayed on the display unit 125, and the number of files contained in the displayed folder to be 1000, prior art required the storage capacity of the buffer memory to be 512,000 bytes (512 bytes×1000) or more. However, since the present invention can pre-search and store in the buffer memory only the names to be displayed on the display unit, the storage capacity of the buffer memory need only be 5,524 bytes (512 bytes×3+4 bytes×997) or more. That is, the present invention reduces the storage capacity required to provide the same effect to about $\frac{1}{100}$. Of course, the data management unit 150 based on the present invention may pre-search and load in the buffer memory a pre-specified number of names (for instance, twenty) for faster results in displaying the names.

Hereinafter, the efficiency in entry point management of the present invention is described in detail with reference to the related figures.

FIG. 11 shows an example of a user interface screen where the user has selected the internal memory 145 from the folders displayed to correspond respectively to the internal memory 145 and a mini SD (i.e. external memory 160) shown in the search screen.

The user has selected the 'photo' folder (i.e. C:) among the file and/or folder names displayed in correspondence to the data stored in the internal memory 145. Physical data corresponding to the 'photo' folder is illustrated in FIG. 12.

That is, the data management unit 150 obtains the folder name by interpreting the physical data illustrated in FIG. 12 and displays in on the display unit 125.

Interpreting the physical data commences by interpreting the address (code value) '0x41' 610 to obtain the long name 'photo' 620. The data management unit 150, by referencing the '1' of '0x41,' recognizes that a long name exists in an entry (32 bytes) and that a short name exists in a following entry. Next, the short name 'PHOTO' 630 is obtained, and it is recognized from the code value (i.e. '10') following the short name that the name relates to a folder. If the code value is '0F,' the name will be recognized as the name of a file. Next, the starting position '02 00' 640 is obtained, from which files and/or folders contained in the folder 'photo' are positioned. The data management unit 150 may calculate the address value corresponding to the number (i.e. the starting number) '0x0002' corresponding to the obtained starting position (i.e. '02 00') to search the contents of the contained files and/or folders.

FIG. 13 shows an example of a user interface screen in which the names of files and/or folders contained in the 'photo' folder are displayed on the display unit 125 after the user selects the 'photo' folder of FIG. 12.

For convenience, it is assumed that the number of file and/or folder names displayed on the display unit 125 is three.

According to a typical device, to display the names of files and/or folders contained in the 'photo' folder on the display unit 125, the mobile terminal must obtain the names of all files and/or folders contained in the folder beforehand using FAT information, and the obtained names must be stored in the buffer memory. As illustrated, even the names of the files that might be displayed later (for instance, 'p800106000236.jpg,' 'p800106000241.jpg,' etc.) due to the user's scroll input are recorded in the buffer memory even though only two files are shown on the display unit. Therefore, to store names, the buffer memory must have a maximum storage capacity of 512 bytes×n (the total number of files and/or folders). This is because a maximum of 512 bytes may be used for one name.

However, in a device according to one embodiment of the present invention, the data management unit 150 obtains from the FAT data the names of the files and folders for only the number of names that will be displayed on the display unit 125 and stores them in the buffer memory, while storing only the entry points (e.g. 0x0002, 9) in the buffer memory for obtaining the names of those files and folders that are not displayed. The entry point comprises a starting number (0x0002) and an entry number (for instance, 9) and uses 4 bytes. Therefore, a maximum buffer memory of 512 bytes× 3+4 bytes×(n−3) is sufficient for storing the names. Of course, a pre-specified number of names (for instance, the ten respective names positioned before and after the displayed names) may be stored in the buffer memory for faster results in displaying the names of files and folders via the display unit 125. In this case, the names stored in the buffer memory are not fixed, but are changed to names within a range corresponding to the names displayed on the display unit 125.

Hereinafter, the method of using entry points to obtain file and/or folder names is explained with reference to FIG. 14.

FIG. 14 shows an example of physical data listing file names under the 'photo' folder (i.e. directory).

Since the data management unit 150 must display two file names on the display unit 125, the two file names to be displayed are obtained using FAT information and afterwards stored in the buffer memory. The other file names are not obtained, and only their entry points are stored in the buffer memory.

The method of obtaining the file name 'p800106000226.jpg' displayed first is as follows.

Calculating the starting number (0x0002) of the entry point yields the address value '00023200' 710, and the file name is obtained using the entry number (assigned sequentially in intervals of 32 bytes).

Thus, to obtain a file name corresponding to entry point '0x0002, 3,' the data management unit 150 calculates the address value '00023200' 710 corresponding to 'x0002,' and searches the region corresponding to entry number '3.' Since the entry number 3 starts with a code value of '42,' the extension 'jpg' is obtained using region 720 within the 32 bytes. By sequentially interpreting the '8001' corresponding to region 730, '0' corresponding to region 740, '60002' corresponding to region 750, and '26' corresponding to region 760 in the following 32 bytes (i.e. the region of entry number '4'), the file name 'p800106000236.jpg' is obtained. The obtained file name is stored with the entry point in the buffer memory.

Similarly, the data management unit 150 obtain the file name using the entry point '0x0002, 6' to store in the buffer memory.

File names stored in the buffer memory are organized into a search screen and displayed on the display unit 125.

FIG. 15 illustrates changes in the data stored in the buffer memory when the file names displayed on the display unit 125 are changed due to the user's scroll input.

When the user selects the 'c:' folder, the names of the folders and/or files contained in the selected folder are displayed on the display unit 125.

Screen 760 is the screen displayed initially when entering folder 'c:,' where only the file names 'p800106000226.jpg' and 'p800106000230.jpg' displayed on the display unit 125 are stored in the buffer memory, with only the entry points stored for the other files.

Screen 770 is the screen after the user has moved the cursor down to scroll and show a succeeding file, where only the file names 'p800106000226.jpg,' 'p800106000230.jpg,' and 'p800106000236.jpg' displayed on the display unit 125 are stored in the buffer memory, with only the entry points stored for the other files.

Screen 780 is the screen after the user has moved the cursor down to scroll, whereby the topmost file name has disappeared and a succeeding file name has newly appeared, and only the file names 'p800106000230.jpg,' '800106000236.jpg,' and 'p800106000241.jpg' displayed on the display unit 125 are stored in the buffer memory, with only the entry points stored for the other files. The file name 'p800106000226.jpg' that was previously stored in the buffer memory is deleted.

As described above, storing the file names in the buffer memory for only the number of names that will currently be displayed is sufficient with the present invention, and a large amount of memory may be saved as there is no need to store the long file names.

Of course, the data management unit 150 based on the present invention may further store in the buffer memory a pre-specified number (for instance, ten) of file names previously displayed and a pre-specified number (for instance, ten) of file names to be displayed later with a scroll action, besides the number of file names currently displayed. This allows a quicker display of file names, and solves the problem of different display forms for file names of different applications.

Figure 16:
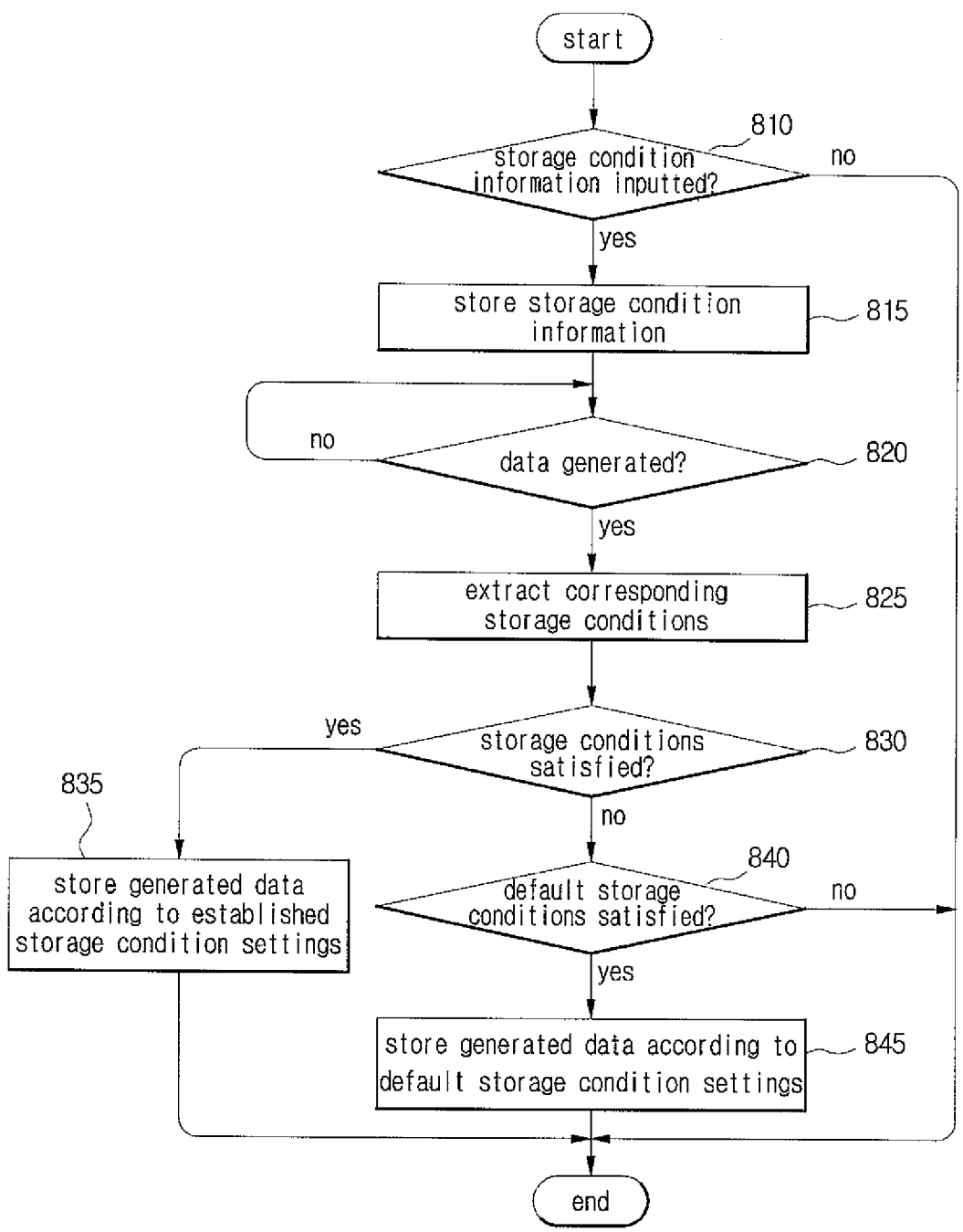
FIG. 16 is a flowchart illustrating a method of specifying the storage area of generated data according to one embodiment of the invention.

FIG. 16 is a flowchart illustrating a method of specifying the storage area of generated data according to one embodiment of the invention.

As described above, as various data can be generated in the mobile terminal 100, and with the need to store various data received over communication networks, the mobile terminal 100 has evolved to be able to join with external memory 160 besides internal memory 145. However, external memory 160 as yet remains a storage space of data, such as MP3 sound files, etc., required for the function operations of the mobile terminal 100, and does not provide a function of directly storing data generated by the mobile terminal 100 in the external memory 160. Therefore, new data generated by the camera unit 170, etc. cannot be stored, if there is no space in the internal memory 145 for storage. To solve such a problem, the mobile terminal 100 based on the present invention provides a method of specifying the storage region for generated data. Hereinafter, the method of specifying the storage space for generated data will be described with reference to FIG. 16.

As shown in FIG. 16, the data management unit 150 of the mobile terminal 100 determines in step 810 whether or not data storage condition information has been inputted by the user. The data storage condition input screen may be added as a main menu item or a submenu item mentioned above. The data storage condition information may comprise, for instance, memory grouping (e.g. specifying the internal memory 145 or external memory 160) for storing images or video clips generated by the camera unit 170, data type (e.g. image, video clip, message, bell ring, MP3 sound data, etc.), folder name corresponding to data type, reaction plans (e.g. storing in a default folder) in the event of an error (for instance, specifying a non-existent folder, lacking storage space in the specified memory), etc.

When the data storage condition information is inputted, the data management unit 150 stores the inputted storage condition information in a pre-specified region of the internal memory 145 in step 815.

Next, the data management unit 150 determines whether or not certain data (e.g. a photographed image, video clip, sent and received short messages, voice recording data, etc.) has been generated due to a function of the mobile terminal 100.

If the data has not been generated, the process the process remains at step 820, and if the data has been generated, the process continues to step 825 to extract the storage conditions corresponding to the generated data. Of course, default storage conditions may be applied if there are no particular storage conditions corresponding to the data.

In step 830, the data management unit 150 determines whether or not the data generated in step 820 can be stored to correspond with the storage conditions extracted in step 825.

If the data can be stored to correspond with the extracted storage conditions, the data is stored in correspondence to the storage conditions in step 835. For example, when the storage condition is to "store images in the photo folder of the external memory 160," if there is storage space available in the external memory 160 and there exists a photo folder, generated images are stored in the folder.

However, if the data cannot be stored to correspond with the extracted storage conditions, the process continues to step 840 to determine whether or not it satisfies default storage conditions. For example, when the storage condition is to "store images in the photo folder of the external memory 160," cases where there is no storage space available in the external memory 160, the external memory 160 is unconnected, or where the photo folder does not exist, etc. are cases wherein the data cannot be stored to correspond with the extracted storage conditions. Also, the default storage conditions may be storage conditions configured for each data type to store the data in the internal memory 145 only, or may be storage conditions that allow portions of the external memory 160 to be used as internal memory 145 when there is no storage space in the internal memory 145.

If the data satisfies default storage conditions, the data management unit 150 continues to step 845 and stores the generated data according to the default storage conditions.

Thus, the mobile terminal 100 based on the present invention may not only specify the storage region for generated data to be internal memory 145 and/or external memory 160, but it can also identify the storage space of other memory devices and store in such a device when the specified memory cannot store the generated data.

As set forth above, a mobile terminal having a function of managing files and folders according to at least one embodiment of the present invention allows easy management of data (e.g. files, folders, etc.) stored in one or more memory devices installed or joined to the mobile terminal.

Also, at least one embodiment of the invention can provide a simple data storage structure allowing a user to easily access a variety of data generated by the functions of the mobile terminal.

Further, at least one embodiment of the invention is convenient to use, since additional automation devices (such as a personal computer or a laptop computer, etc.) or data cables are unnecessary in managing the stored data in one or memory devices.

In addition, at least one embodiment of the invention can maximize efficiency in memory use, since the storage region for data generated by the mobile terminal may be configured not only as internal memory but also external memory.

The drawings and detailed descriptions are for illustrative purposes only with regard the present invention. They are used merely to explain the invention, and do not limit the invention as set forth in the claims. Therefore, those skilled in the art will understand that many variations and other embodiments may be made without departing from the scope of the invention. The scope of the invention will thus be defined only by the spirit of the invention as set forth in the appended claims.

What is claimed is:

1. A method of performing a search function in a mobile terminal, comprising:
displaying folder items representing one or more memory elements installed in or joined to the mobile terminal on a display unit, when a request to perform a search function is received;
storing, in a working memory, an entry point corresponding to each of selection items within a folder selected by a selection command when the selection command is received, the entry point comprising address information and an entry number used to search for name information of the corresponding selection item; and
further storing, in the working memory, name information for a predefined number of the selection items by searching the name information based on each corresponding entry point, the stored name information for the predefined number of the selection items being displayed on the display unit,
wherein for the remaining selection items not displayed on the display unit, only the corresponding entry point is stored in the working memory.

2. The method of claim 1, further comprising:
determining whether or not a scroll command is received for renewing the selection items displayed on the display unit; and
obtaining the name information of a selection item newly included in the display area based on its entry point, and storing the obtained name information in the working memory, when the scroll command is received.

3. The method of claim 2, further comprising:
determining whether or not the number of names stored in the working memory including the names of the selection items newly stored based on the scroll command exceeds the predefined number; and
deleting from the working memory the name information of the selection item positioned farthest from the display area, when the number of names in the name information exceeds the predefined number.

4. A mobile terminal, comprising:
a display unit;
a working memory configured to store management information corresponding to folders or files to be displayed on the display unit; and
a data management unit configured to store and manage name information or an entry point corresponding to each of the folders or the files as the management information in the working memory,
wherein the data management unit is configured to store the name information as the management information if the folder or the file is displayed on the display unit and store only the corresponding entry point as the management information if the folder or the file is not displayed on the display unit, and
wherein the entry point comprises address information and an entry number used to search for name information of the corresponding folder or file.

5. The mobile terminal of claim 4, wherein the size of the entry point is 4 bytes.

6. A mobile terminal for performing a search function, comprising:
one or more memory elements;
a key input unit configured to receive as input an execute search function request or a select command for a folder item;
a data management unit configured to generate a main search screen containing folder items that represent the memory elements when the execute search function request is received, and generate a sub search screen containing selection items corresponding to at least one of files and subfolders contained in the folder item when the select command is received; and
a display unit configured to display the main search screen and the sub search screen;
wherein the data management unit is further configured to i) store in a working memory an entry point corresponding to each of the selection items, ii) obtain the names of an n number (where n is a natural number) of the selection items predefined to correspond with the display area of the display unit based on the entry points and file allocation table (FAT) information of the corresponding selection items and iii) store the obtained names in the working memory, and iv) generate the sub search screen using the names of the stored selection items, and
wherein the data management unit is configured to store only the corresponding entry point as the management information if the corresponding selection item is not displayed on the display unit; and
wherein the entry point comprises address information and an entry number used to search for name information of the corresponding selection item.

7. The mobile terminal of claim 6, wherein the data management unit is further configured to obtain the names of selection items newly incorporated into the display area based on the entry points of the selection items, when a scroll command is received from the key input unit to renew the selection items, and renew the sub search screen.

8. The mobile terminal of claim 7, wherein the data management unit is further configured to delete the names of the selection items positioned farthest from the display area of the display unit from the working memory, when the number of names stored in the working memory including the names of selection items newly stored based on the scroll command exceeds a predefined number m (where m is a natural number).

9. An apparatus for performing a search function in a mobile terminal, comprising:
- a memory storing a set of instructions;
- a processor to execute the instructions to implement operational functions of the mobile terminal;
- means for displaying folder items representing one or more memory elements installed in or joined to the mobile terminal on a display unit, when a request to perform a search function is received;
- means for storing, in a working memory, an entry point corresponding to each of selection items within a folder selected by a selection command when the selection command is received, the entry point comprising address information and an entry number used to search for name information of the corresponding selection item; and
- means for further storing, in the working memory, name information for a predefined number of the selection items by searching the name information based on each corresponding entry point, the stored name information for the predefined number of the selection items being displayed on the display unit, wherein for the remaining selection items not displayed on the display unit, only the corresponding entry point is stored in the working memory.

* * * * *